US006477889B2

(12) United States Patent
Yamaki

(10) Patent No.: US 6,477,889 B2
(45) Date of Patent: Nov. 12, 2002

(54) DIAGNOSING APPARATUS FOR EVAPORATION PURGE SYSTEM AND PRESSURE SENSOR

(75) Inventor: Masahito Yamaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/745,538

(22) Filed: Dec. 21, 2000

(65) Prior Publication Data

US 2001/0004844 A1 Jun. 28, 2001

(30) Foreign Application Priority Data

Dec. 27, 1999 (JP) .......................................... 11-368703

(51) Int. Cl.$^{7}$ ................................................ G01M 3/08

(52) U.S. Cl. ..................... 73/40.5 R; 73/49.7; 73/118.1

(58) Field of Search ............................... 73/40, 40.5 R, 73/49.7, 118.1; 123/520; 702/51

(56) References Cited

U.S. PATENT DOCUMENTS 5,191,870 A * 3/1993 Cook ......................... 123/520
5,499,613 A * 3/1996 Bayerle et al. ............. 123/520
5,546,789 A * 8/1996 Balke et al. ................... 73/40
5,726,354 A * 3/1998 Nomura et al. ............ 73/118.1
5,803,056 A * 9/1998 Cook et al. ................. 123/520
5,845,625 A * 12/1998 Kidokoro et al. ........... 123/520
5,878,728 A * 3/1999 Kidokoro et al. ........... 123/520
5,975,062 A * 11/1999 Bonse et al. ................ 123/519
5,987,968 A * 11/1999 Cook et al. .................. 73/49.7
6,089,080 A * 7/2000 Takaku et al. ............. 73/117.3
6,105,556 A * 8/2000 Takaku et al. .............. 123/520
6,276,343 B1 * 8/2001 Kawamura et al. ......... 123/520
6,279,383 B1 * 8/2001 Balke et al. .................... 73/40
6,305,361 B1 * 10/2001 Takaku et al. .............. 123/520

FOREIGN PATENT DOCUMENTS

JP 617715 1/1994
JP 2001-182629 * 7/2001 .......... F02M/25/08

OTHER PUBLICATIONS

US20010029931A1, Oct. 18, 2001, Burke et al., 123/520.*
US 2001/0004844 A1, Jun. 28, 2001, Yamaki.*

* cited by examiner

*Primary Examiner*—Hezron Williams
*Assistant Examiner*—Charles D. Garbor
(74) *Attorney, Agent, or Firm*—Martin A. Farber

(57) ABSTRACT

A highly accurate diagnosing apparatus for an evaporation purge system, which is not so easily affected by fluctuation in an atmospheric pressure. An evaporation system including a fuel tank is set in a pressure state different from an atmospheric pressure, and then hermetically sealed during leakage diagnosis. A reference pressure is introduced to the reference pressure introduction side of a relative pressure sensor, and a pressure in the evaporation system is introduced to the detected pressure introduction side thereof. In an atmosphere introduction passage for opening the reference pressure introduction side of the relative pressure sensor to atmosphere, a solenoid valve is provided for the relative pressure sensor. During the leakage diagnosis, a control unit sets the solenoid valve in a closed state, holds the reference pressure at a constant value, and then determines the presence of leakage in the evaporation system based on a relative pressure change detected by the relative pressure sensor.

1 Claim, 3 Drawing Sheets

DIAGNOSING APPARATUS FOR EVAPORATION PURGE SYSTEM AND PRESSURE SENSOR

BACKGROUND OF THE INVENTION

The present invention relates to a diagnosing apparatus for an evaporation purge system and a pressure sensor. More particularly, the invention is directed to a leakage diagnosing apparatus for an evaporation system including a fuel tank, and a pressure sensor suitably used for leakage diagnosis.

An internal combustion engine provided with an evaporation purge system has been in wide use in order to prevent fuel evaporated in a fuel tank from being discharged into the atmosphere. In such an evaporation purge system, fuel evaporated (hereinafter call evaporation) in the fuel tank is temporarily adsorbed by adsorbents filling the inside of a canister. Then, the adsorbed evaporation is discharged through a purge passage to the intake system of the internal combustion engine under a predetermined running condition. However, when the passage in the evaporation purge system is damaged or broken for one reason or another, the evaporation is discharged into the atmosphere. Generally, therefore, leakage diagnosis is carried out for the evaporation system including the fuel tank.

To carry out such a leakage diagnosis, first, the inside of the evaporation system targeted for leakage diagnosis is set in a negative pressure state by using an intake manifold negative pressure or in a positive pressure state by using a pump or the like, and then the evaporation system is hermetically sealed. Then, a change in the pressure of the evaporation system (system inner pressure) is monitored to determine the presence of leakage. However, a problem is inevitable in this case. Specifically, if a relative pressure sensor is used as a pressure sensor for detecting the system inner pressure, fluctuation in an atmospheric pressure causes erroneous determination. The relative pressure sensor is designed to detect a difference between a pressure to be detected and an atmospheric pressure as a reference pressure, i.e., a relative pressure. Thus, when fluctuation occurs in the atmospheric pressure itself, the relative pressure is changed even if the system inner pressure is constant, resulting in the impossibility of discriminating this change from a pressure change caused by leakage. Such fluctuation in the atmospheric pressure occurs because of a change in a car speed (change in a ram pressure), a pressure change during driving on a slope or the like.

In order to solve the foregoing problem, for example, Japanese Patent Application Laid-Open No. Hei. 6-17715 discloses a technology for preventing erroneous determination caused by the effect of a change in the atmospheric pressure by using an atmospheric pressure sensor. This technology is specifically designed to determine the presence of a failure by detecting a system inner pressure from the inside of the evaporation system to the fuel tank, and comparing the changing amount of this detected pressure with a predetermined value. In this case, an atmospheric pressure is detected by the atmospheric pressure sensor and, according to the detected atmospheric pressure, the value of the detected pressure and the predetermined value are corrected.

If the atmospheric pressure sensor like that available in the foregoing conventional art is used, because of detection accuracy required in the leakage diagnosis, the atmospheric pressure sensor must have resolution high enough to detect a very small atmospheric pressure change of 1000 pa or lower. In addition, to deal with various driving conditions including low land and high land driving, the detection range of the atmospheric pressure sensor must be wide. In reality, however, it is not easy to inexpensively manufacture a highly accurate atmospheric pressure sensor capable of satisfying both of such resolution and detection range.

SUMMARY OF THE INVENTION

Therefore, an object of the present invention is to provide a highly accurate diagnosing apparatus for an evaporation purge system which is not so easily affected by fluctuation in an atmospheric pressure.

Another object of the invention is to provide a pressure sensor which is not so easily affected by fluctuation in an atmospheric pressure and capable of detecting a pressure in a wide detection range with high accuracy.

In order to achieve the foregoing objects, in accordance with a first aspect of the present invention, there is provided a diagnosing apparatus for an evaporation purge system comprising: hermetically sealing means for setting an evaporation system including a fuel tank in a pressure state different from an atmospheric pressure, and then hermetically sealing the evaporation system during leakage diagnosis; a relative pressure sensor having a reference pressure introduction side, to which a reference pressure is introduced, and a detected pressure introduction side, to which a pressure in the evaporation system is introduced; a valve provided in the reference pressure introduction side; control means for setting the valve in a closed state during the leakage diagnosis; and determination means for determining the presence of leakage in the evaporation system based on a pressure change detected by the relative pressure sensor.

In accordance with a second aspect of the invention, there is provided a pressure sensor comprising: a relative pressure sensor having a reference pressure introduction side, to which a reference pressure is introduced, and a detected pressure introduction side, to which a pressure in a space to be detected is introduced; and a valve provided in a passage for opening the reference pressure introduction side to atmosphere.

In the pressure sensor, when a pressure introduced to the detected pressure introduction side is detected by the relative pressure sensor, a reference pressure introduced to the reference pressure introduction side should preferably be held by setting the valve in a closed state.

According to the present invention, the valve is provided in the reference pressure introduction side of the relative pressure sensor, and the relative pressure of a space to be detected (evaporation system including the fuel tank) is detected while the valve is closed. Accordingly, the detection of the relative pressure can be carried out without any influence of atmospheric pressure fluctuation and with high reliability. Moreover, by carrying out leakage diagnosis for the evaporation purge system based on such detected relative pressure, it is possible to improve the reliability of the leakage diagnosis.

BRIEF DESCRIPTION OF THE DRAWINGS

These and other objects and features of the present invention will become clear from the following description with reference to the accompanying drawings, wherein.

DETAILED DESCRIPTION OF THE PREFERRED EMBODIMENTS

Figure 1:
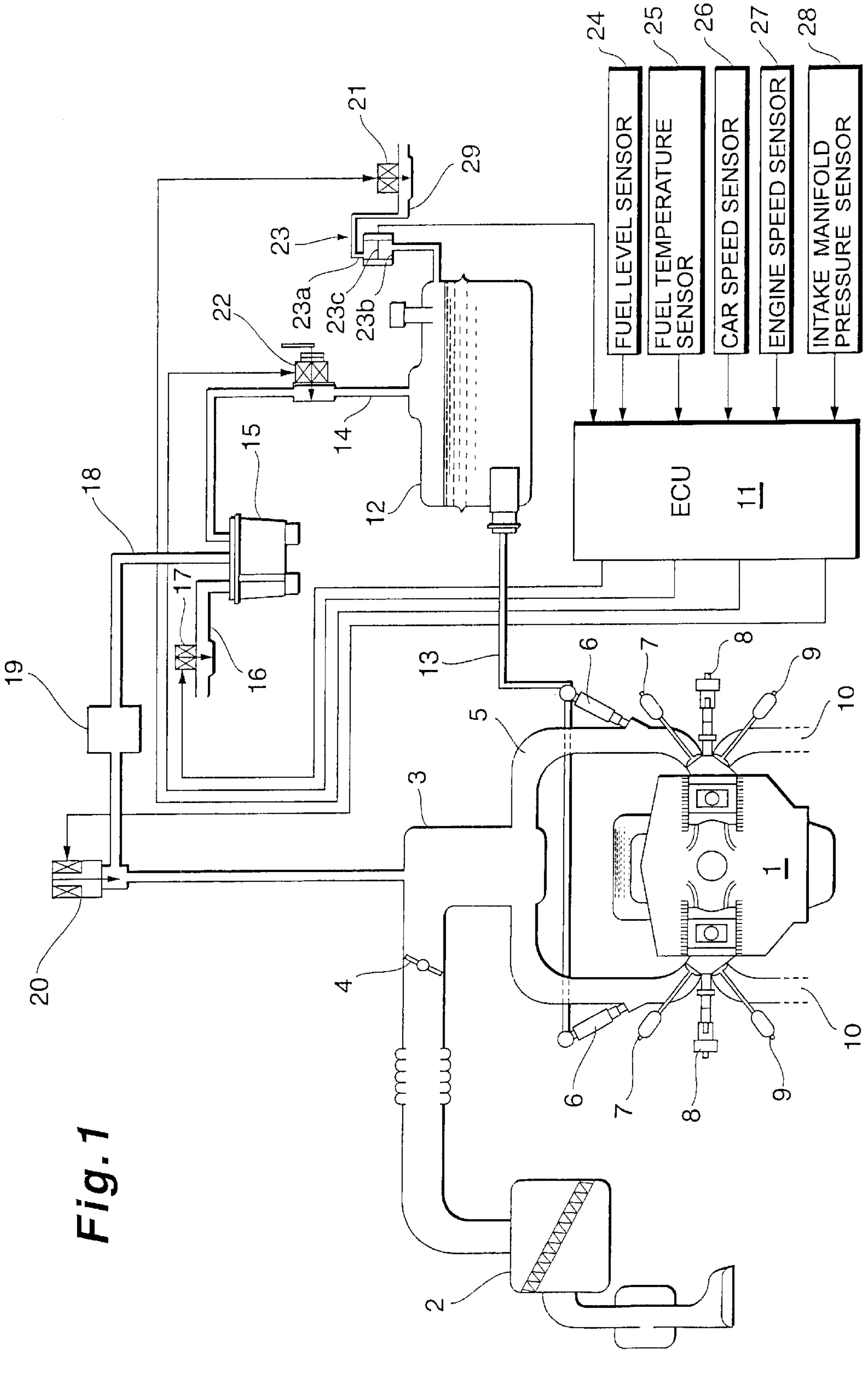
FIG. 1 is a view showing a system configuration according to an embodiment of the present invention.

FIG. 1 illustrates a system configuration according to an embodiment of the present invention. Air without dust in atmosphere, which is eliminated by an air cleaner 2, is controlled for its flow rate according to the opening degree of an electric throttle valve 4. The throttle valve 4 is provided in an intake passage between the air cleaner 2 and an air chamber 3, and a throttle opening degree thereof is set by an electric motor (not shown). A control unit 11 (referred to as "ECU", hereinafter) composed of a microcomputer or the like calculates a throttle opening degree based on an engine speed, the pressing amount of an accelerator pedal equivalent to a required engine load, or the like, and accordingly outputs a control signal to the electric motor. The intake air of the flow rate controlled according to the throttle opening degree is passed through the air chamber 3 and an intake manifold 5, and then mixed with fuel (gasoline) injected from an injector 6. The injector 6 is disposed so as to be partially protruded into the intake manifold 5, and provided for each cylinder of an engine 1. Pressure-controlled fuel is supplied to each injector 6 through a fuel pipe 13 communicated with a fuel tank 12. An air-fuel mixture formed inside the intake manifold 5 is caused to flow into the combustion chamber of the engine 1 by opening an intake valve 7. The air-fuel mixture is ignited by an ignition plug 8 to burn the mixture, and thereby a driving force is generated for the engine 1. The ECU 11 controls the fuel injection amount of the injector 6, the injection timing thereof and the ignition timing of the ignition plug 8 based on sensor signals from various sensors including an accelerator opening sensor (not shown), and so on. Gas after combustion is discharged from the combustion chamber to an exhaust passage 10 by opening an exhaust valve 9.

Evaporation generated inside the fuel tank 12 is discharged to the air chamber 3 of an intake system by an evaporation purge system. Specifically, the fuel tank 12 is communicated with a canister 15 through an evaporation passage 14 provided at the upper portion of the fuel tank. The evaporation in the fuel tank 12 is adsorbed by adsorbents containing activated carbon or the like and filling the inside of the canister 15. Only gas containing no fuel components (especially hydrocarbon (HC) or the like) is discharged through a fresh air introduction passage 16 into the atmosphere. The fresh air introduction passage 16 includes an atmosphere open solenoid valve 17 controlled for its opening/closing by the ECU 11. During normal valve control excluding the time of leakage diagnosis, the solenoid value 17 is set in an open state.

The evaporation passage 14 includes a pressure control solenoid valve 22 provided to control the inner pressure (tank inner pressure) of the fuel tank 12. The solenoid valve 22 has a mechanical pressure control mechanism. Specifically, when the tank inner pressure is increased to a set pressure or higher by evaporation generated in the fuel tank 12, the valve is opened by the mechanical mechanism. Accordingly, the generated evaporation is caused to flow toward the canister 15 because of a pressure difference between the fuel tank 12 and the canister 15, and the excessive increase of the tank inner pressure is suppressed. Conversely, when the fuel tank 12 is cooled and its inside is set in a negative pressure state, the solenoid valve 22 is linearly opened according to the level of the negative pressure. Thus, the negative pressure in the fuel tank 12 is prevented from becoming excessively large, thereby preventing the deformation or breakage of the fuel tank 12. In addition, irrespective of the above pressure state, by operating an electromagnetic solenoid according to a control signal from the ECU 11, the solenoid valve 22 is forcibly opened. During normal valve control excluding the time of leakage diagnosis, the solenoid valve 22 is opened/closed by a mechanical operation according to the state of a pressure introduced to the valve 22 (electromagnetic solenoid of the valve 22 is not operated).

On the other hand, a chamber 19 is formed in a purge passage 18 for communicating the canister 15 with the air chamber 3 of the intake system, and a canister purge control valve 20 is provided in the downstream side thereof. The canister purge control valve 20 (referred to as "CPC valve", hereinafter) is a duty solenoid valve, the opening degree of which is set according to a duty ratio of a control signal outputted from the ECU 11. The amount of purging is controlled based on the opening degree of the valve. During normal valve control, the opening degree of the CPC valve 20 is controlled according to a running state. In addition, the chamber 19 provided in the upstream side of the CPC valve 20 is designed to reduce flow or pulsation noise generated by the opening/closing of the CPC valve 20.

A relative pressure sensor 23 is attached to the upper portion of the fuel tank 12. The relative pressure sensor 23 is provided to detect a relative pressure PS inside the fuel tank 12 by using a reference pressure (atmospheric pressure) as a reference. The sensor 23 includes a diaphragm 23*c* for partitioning a reference pressure introduction side 23*a*, to which the reference pressure is introduced, and a detected pressure introduction side 23*b*, to which the tank inner pressure (equivalent to the above-described system inner pressure) is introduced, and a strain gauge for detecting the displacement of the diaphragm 23*c*. The diaphragm 23*c* is displaced according to a pressure difference between the reference pressure and the tank inner pressure, and the strain gauge outputs a voltage according to the amount of its displacement. Since there is one-to-one relation between this output voltage and the pressure difference, a correlation between the output voltage and a relative pressure is obtained by an experiment, simulation or the like, and the obtained correlation is stored as a map in a ROM of the ECU 11. In this way, the relative pressure PS of the fuel tank 12 can be calculated from the output voltage of the relative pressure sensor 23. The relative pressure PS may also be calculated from a relational expression between the output voltage and the relative pressure.

An atmosphere introduction passage 29 is provided to introduce atmosphere to the reference pressure introduction side 23*a* of the relative pressure sensor 23. In this atmosphere introduction passage 29, a solenoid valve 21 for the relative pressure sensor is provided and is controlled for its opening/closing by the ECU 11. While the solenoid valve 21 is opened, the reference pressure of the reference pressure introduction side 23*a* is an atmospheric pressure. During normal valve control, the solenoid valve 21 is set in an open state.

The ECU 11 performs combustion control according to a control program stored in the ROM, and leakage diagnosis for the evaporation system including the fuel tank 12 in the above-described evaporation purge system. Sensors important for the leakage diagnosis may include the relative pressure sensor 23 and respective sensors 24 to 28. The fuel level sensor 24 is attached in the fuel tank 12, and designed to detect the residual level L of stored fuel. The fuel temperature sensor 25 is designed to detect a fuel temperature TEMP, and the car speed sensor 26 is designed to detect a car speed υ. The engine speed sensor 27 is designed to detect an engine speed Ne, and the intake manifold pressure sensor 28 is designed to detect an intake manifold pressure Pin (e.g., intake manifold negative pressure in the air chamber 3 ) in the downstream of the throttle valve 4.

Figure 2:
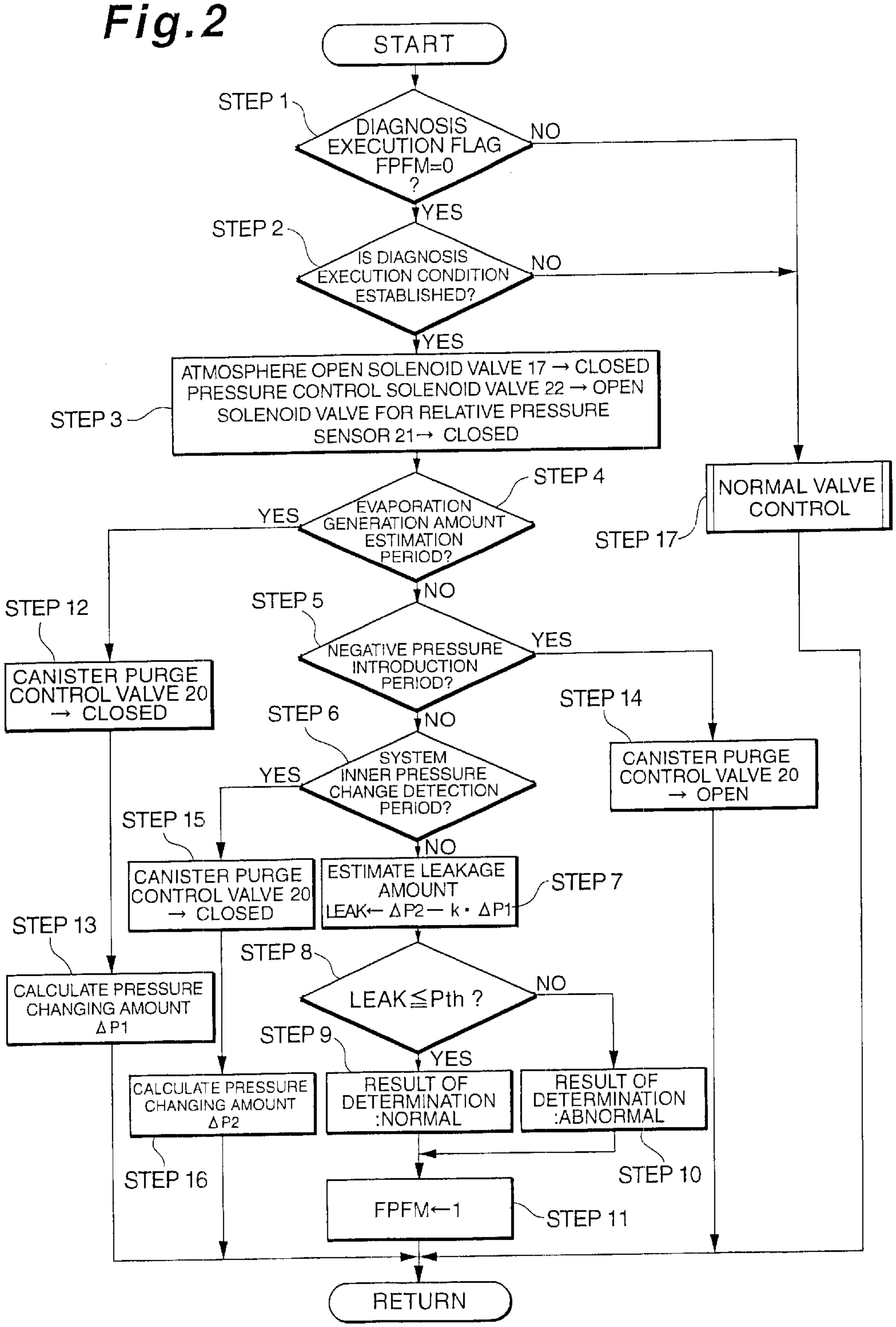
FIG. 2 is a flowchart showing a leakage diagnosing routine according to the embodiment of the present invention.

FIG. 2 is a flowchart showing a leakage diagnosis routine according to the described embodiment. The ECU 11 repeatedly executes this diagnosis routine at specified intervals (e.g., 10 ms). First, in step 1, determination is made as to whether a diagnosis execution flag FPFM is "0" or not. The diagnosis execution flag FPFM is initially set equal to "0" according to an initial routine at the time of starting the engine. The flag is set equal to "1" only when leakage diagnosis is properly completed (step 11 ). After the flag FPFM is set equal to "1", this state is maintained until the engine is stopped.

If the determination is affirmative in step 1, in other words, if the leakage diagnosis is not yet completed, then determination is made as to whether the following diagnosis execution conditions are all provided or not (step 2).

[Diagnosis execution conditions]

(1) Fuel swinging in the fuel tank is small

When fuel swinging in the fuel tank 12 is large, a tank inner pressure is greatly changed, resulting in the possibility of erroneous determination in the leakage diagnosis. Thus, fuel swinging in the fuel tank 12 is specified by using the fuel level sensor 24. The fuel swinging can be estimated based on a changing amount ΔL per unit time of a fuel amount L detected by the fuel level sensor 24. That is, when the changing amount ΔL is larger than a properly predetermined value, the execution of leakage diagnosis is not permitted, determining that fuel swinging is large.

(2) Fuel temperature is low to a certain extent

Since a high fuel temperature leads to the greater amount of evaporation generation, it is difficult to determine the presence of leakage in the evaporation system. Thus, a fuel temperature TEMP is detected by using the fuel temperature sensor 25. When the fuel temperature TEMP is larger than a properly predetermined value, then the execution of leakage diagnosis is not permitted.

(3) Intake manifold negative pressure is large to a certain extent

Evaporation adsorbed in the canister 15 is purged to the intake system by using a pressure difference between a pressure in the canister 15 and an intake manifold pressure. When an intake manifold negative pressure is small, it is difficult for the evaporation to flow into the intake passage even if the CPC valve 20 is opened. Consequently, it is difficult to secure a negative pressure state in the evaporation system. Thus, an intake manifold pressure Pin is detected by using the intake manifold pressure sensor 28 and, when an intake manifold negative pressure is smaller than a properly predetermined value, the execution of leakage diagnosis is not permitted.

In addition to the foregoing basic conditions (1) to (3), a condition may be set, where an engine speed Ne or a car speed υ is larger than a specified value (e.g., Ne≧1500 rpm, or υ≧70 km/h). These conditions are set for the purpose of carrying out leakage diagnosis during high-speed driving, the state of which is relatively stable.

If the leakage diagnosis has already been finished, or if none of the diagnosis execution conditions are established, then the process moves from the negative determination in step 1 or step 2 to step 17, where the following normal valve control is executed.

| [Normal valve control] | |
|---|---|
| Atmosphere open solenoid valve 17 | Opened |
| CPC valve 20 | Opened/closed according to running state |
| Solenoid valve 21 for relative pressure sensor | Opened |
| Pressure control solenoid valve 22 | Opened/closed by mechanical mechanism |

On the other hand, if affirmative determination is made in step 2, in other words, if leakage diagnosis is not yet completed and the diagnosis execution conditions are established, then the process moves to the procedures of step 3 and after, and leakage diagnosis for the evaporation system is carried out. The execution procedures of leakage diagnosis will be described by referring to the timing chart of FIG. 3. The leakage diagnosis proceeds, with its start timing set at t0, in the order of the estimation of an evaporation generation amount (period t0 to t1), the introduction of a negative pressure into the evaporation system (period t1 to t2), and the detection of a change in a system inner pressure (period t2 to t3).

First, in step 3, the atmosphere open solenoid valve 17 and the solenoid valve 21 for the relative pressure sensor are closed, and the pressure control solenoid valve 22 is forcibly opened by the electromagnetic solenoid. The target of the leakage diagnosis in the embodiment is the evaporation system including the fuel tank 12 (the evaporation passage 14, the canister 15, the purge passage 18 for communicating the CPC valve 20 with the canister 15, and so on).

At each cycle of the diagnosis routine in the period t0 to t1 of the evaporation generation amount estimation, after affirmative determination made in step 4, the procedures of step 12 and after are executed. Specifically first, the CPC valve 20 is closed (step 12), and then calculation is made as to the changing amount ΔP1 of a relative pressure PS (detected by the relative pressure sensor 23) in the period t0 to t1 of the evaporation generation amount estimation (step 13). As described above, the solenoid valve 21 provided in the reference pressure introduction side 23*a* of the relative pressure sensor 23 is closed. Accordingly, the reference pressure of the relative pressure sensor 23 is substantially held at an atmospheric pressure P0 at a timing t0 when the valve 21 is closed. Therefore, the changing amount ΔP1 of the relative pressure PS is dependent only on the generation amount of evaporation in the fuel tank 12 without being affected by fluctuation in the atmospheric pressure. The relative pressure PS is increased with time as the generation amount of evaporation is larger. Thus, based on a difference between a minimum value PSmin and a maximum value PSmax in the period t0 to t1, the changing amount ΔP1 of the relative pressure can be considered as the generation amount of evaporation. As described later, the changing amount ΔP1 is used as a correction value for estimating the amount of leakage.

At each cycle in the period t1 to t2 of negative pressure introduction subsequent to the period t0 to t1 of the evaporation generation amount estimation, affirmative determination is made in step 5, followed by executing the procedure of step 14. In step 14, the CPC valve 20 which has been closed is opened, and thus, the relative pressure PS of the evaporation system including the fuel tank 12 is steeply reduced because of an intake manifold negative pressure (i.e., a negative pressure in the evaporation system becomes larger). Then, at a point of time t2 when the relative pressure PS reaches a specified pressure, the introduction of the negative pressure into the evaporation system is finished.

At each cycle in the period t2 to t3 of the detection of a system inner pressure change subsequent to the period t1 to t2 of the negative pressure introduction, affirmative determination is made in step 6, followed by executing the procedures of step 15 and after. First, in step 15, the CPC valve 20 which has been opened is closed again. Then, in step 16, calculation is made as to the changing amount ΔP2 of a relative pressure PS in the period t2 to t3 of the system inner pressure change detection. As described above, the solenoid valve 21 is closed, and thus, the reference pressure of the relative pressure sensor 23 is held at the pressure P0. Accordingly, the changing amount ΔP2 of the relative pressure is dependent on the generation amount of evaporation in the fuel tank 12 and the amount of leakage in the evaporation system. The changing amount ΔP2 of the relative pressure is calculated based on a difference between a minimum value PSmin and a maximum value PSmax in the period t2 to t3.

After the end of the period t2 to t3 of the system inner pressure change detection, at a succeeding cycle, negative determination is made in step 6, and the process moves to step 7. In step 7, based on a difference between the two relative pressure changing amounts ΔP1 and ΔP2 which have been calculated, estimation is made as to the amount of leakage LEAK in the evaporation system including the fuel tank 12. As described above, the changing amount ΔP2 of the relative pressure is affected not only by the leakage in the evaporation system but also by the generated evaporation. Thus, from the changing amount ΔP2, a value obtained by multiplying the changing amount ΔP1 caused only by the generation of evaporation by a weighting factor k (value of k is decided by a fuel tank capacity or the like) is subtracted. In this way, a pressure changing amount equivalent to the amount of leakage in the evaporation system can be obtained as LEAK. As the value of LEAK is larger, the amount of leakage in the evaporation system is larger.

Then, in step 8 after step 7, determination is made as to whether the amount of leakage LEAK is equal to a specified predetermined threshold value Pth (e.g., 300 pa) or lower. If affirmative determination is made in step 8, in other words if the amount of leakage is small, then the result of determination is "normal" (step 9). If negative determination is made, then the result of determination is "abnormal" (step 10). Then, in step 11 after steps 9 and 10, the diagnosis execution flag FPFM is changed from "0" to "1". Although not described in detail herein, the result of leakage diagnosis is reflected on a leakage NG flag stored in a backup RAM of the ECU 11 (e.g., normal when the leakage NG flag is 0, and abnormal when it is 1). The result of leakage diagnosis can be known by connecting a portable failure diagnosing device (serial monitor) to an external connector (not shown) of the ECU 11 and reading the value of the leakage NG flag. In addition, when the determination of leakage is abnormal, the abnormality is notified to a driver by lighting an alarm lamp disposed in an instrument panel and connected to an output port of the ECU 11. For the details on the reading of the failure diagnosis result (trouble data) by the serial monitor and the alarm lamp, refer to Japanese Patent Publication No. Hei. 7-76730 by the same applicant.

Thus, in the leakage diagnosis according to the described embodiment, first, the atmosphere open solenoid valve 17 and the solenoid valve 21 for the relative pressure sensor are closed, and the pressure control solenoid valve 22 and the CPC valve 20 are opened. Accordingly, the evaporation system (system to be diagnosed) including the fuel tank 12 is set in a pressure state (negative pressure state in the embodiment) different from the atmospheric pressure. Then, the CPC valve 20 is closed to hermetically seal the system to be diagnosed. The changing amount of a relative pressure PS in the system to be diagnosed, which has been hermetically sealed, is monitored. In this case, since the solenoid valve 21 for the relative pressure sensor is in the closed state, during leakage diagnosis, the reference pressure of the reference pressure introduction side 23*a* of the relative pressure sensor 23 is held at the atmospheric pressure immediately after the closing of the valve 21. Accordingly, even when fluctuation occurs in the atmospheric pressure during the leakage diagnosis, since the reference pressure of the relative pressure sensor 23 is held constant, the change of the relative pressure in the evaporation system can be monitored without being affected by the atmospheric pressure fluctuation. As a result, it is possible to effectively prevent a reduction in the reliability of leakage determination caused by the atmospheric pressure fluctuation.

Figure 3:
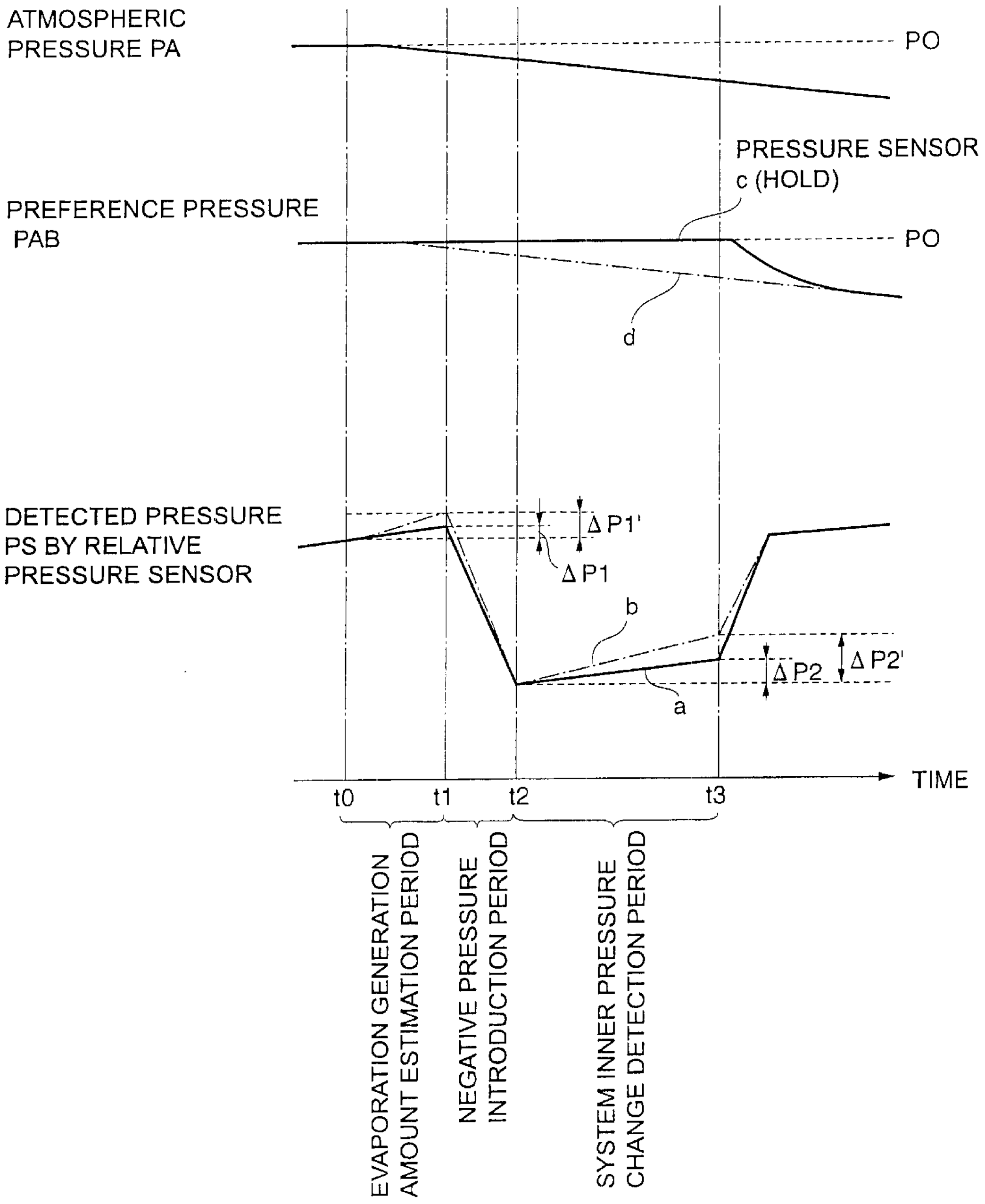
FIG. 3 is a timing chart showing a pressure change detected by a relative pressure sensor.

For example, considering the state of a vehicle changing from flat road driving to slope ascending, as shown in FIG. 3, an atmospheric pressure PA is gradually reduced as the vehicle starts ascending the slope. If the solenoid valve 21 for the relative pressure sensor is not provided, because of the direct introduction of the atmospheric pressure PA to the relative pressure sensor 23, the reference pressure detection side pressure PAB of the sensor 23 is, as indicated by a chain line d, reduced as in the case of the atmospheric pressure PA. Fluctuation thus occurs in the relative pressure PS by the effect of the pressure PAB as indicated by a chain line b. Consequently, even when the amount of leakage in the evaporation system is within a normal range, the amount of leakage LEAK (ΔP2'−k·ΔP1') may exceed a predetermined value Pth, bringing about the determination of "abnormality".

On the other hand, in the leakage diagnosis of the embodiment, the relative pressure PS is detected while the solenoid valve 21 for the relative pressure sensor is closed. Since the reference pressure PAB of the relative pressure sensor 23 is held constant at P0 by closing the valve 21 (see solid line c), the relative pressure PS can be detected with almost no influence of the fluctuation of the atmospheric pressure PA (see solid line a). As a result, when the leakage diagnosis is carried out for the evaporation system, it is possible to effectively suppress erroneous determination caused by the fluctuation of the atmospheric pressure PA. Moreover, since leakage diagnosis enables conditions regarding an external air pressure, a car speed, and so on to be relaxed, the effectiveness and accuracy of diagnosis can be improved.

It is also possible to carry out proper leakage diagnosis only by the relative pressure sensor 23 even without any direct measuring of the atmospheric pressure by the atmospheric pressure sensor. As describe above, it is difficult to obtain an inexpensive atmospheric pressure sensor provided with both high resolution and a wide detection range. Thus, under all the driving conditions (especially, the fluctuation range of the atmospheric pressure due to a level difference), it is difficult to detect a very small change in the atmospheric pressure by the atmospheric pressure sensor. On the other hand, according to the present invention, during the leakage diagnosis, the reference pressure is held by closing the valve 21 of the reference pressure side of the relative pressure sensor 23. Accordingly, since the effect of the atmospheric pressure fluctuation can be eliminated, it is possible to carry out proper leakage diagnosis even if the state of the atmospheric pressure is not directly detected by the atmospheric pressure sensor.

The embodiment has been described with reference to the case where during the leakage diagnosis, the system to be diagnosed (i.e., the evaporation system including the fuel tank) is set in the negative pressure state by using the intake manifold negative pressure. However, the present invention is not limited thereto, and for example the system to be diagnosed may be set in a positive pressure state pressurized by a pump. Therefore, the diagnosing apparatus of the evaporation purge system of the present invention can be widely applied to the system for setting the pressure state of the system to be diagnosed atone different from the atmospheric pressure, hermetically sealing it and then monitoring a pressure change in the hermetically sealed state.

In the embodiment described above, the relative pressure sensor 23 and the solenoid valve 21 for the relative pressure sensor are communicated with each other through the atmosphere introduction passage 29. However, these elements can be formed in one body. In such a case, the solenoid valve 21 for the relative pressure sensor is integrally provided in a passage (passage for releasing atmosphere to the reference pressure introduction side) in the relative pressure sensor 23. In this way, since the necessity of separately providing the atmosphere introduction passage 29 is eliminated, it is possible to remove the effect of the expansion/contraction of the atmosphere introduction passage 29 caused by an atmospheric pressure change, enabling pressure detection to be carried out with higher accuracy.

In addition, in the atmosphere introduction passage 29 for communicating the relative pressure sensor 23 and the solenoid valve 21 for the relative pressure sensor with each other, a sub-chamber (damper) may be provided so as to be expanded/contracted at a rate substantially equal to that for the fuel tank 12 with respect to an atmospheric pressure change. A change may occur in a pressure in the evaporation system following fluctuation in the capacity of the fuel tank 12 caused by an atmospheric pressure change. In this case, if a sub-chamber like that described above is provided in the reference pressure introduction side 23*a* of the relative pressure sensor 23, the reference pressure of the reference pressure introduction side 23*a* is changed similarly to the pressure change of the detected pressure introduction side 23*b*, and thus the fluctuation in the capacity of the fuel tank 12 is canceled. Therefore, it is possible to carry out leakage diagnosis with higher accuracy.

The use of the relative pressure sensor as a pressure sensor for monitoring a change in the tank inner pressure during the leakage diagnosis is the most preferable example. However, the present invention is not limited thereto. In other words, by using the pressure sensor according to the present invention, without any influence of atmospheric pressure fluctuation, it is possible to detect a pressure (relative pressure) in a space to be detected in a wide detection range with good accuracy. The pressure sensor according to the present invention can be widely applied to a detection environment having such a requirement.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A diagnosing apparatus for an evaporation purge system of an internal combustion engine, comprising:

a first valve for connecting an evaporation system including a fuel tank to open air;

a second valve located at an intermediate position between said evaporation system and an intake system of said internal combustion engine:

a relative pressure sensor having an introduction side of a reference pressure, the reference pressure being introduced thereto, and an introduction side of a detected pressure, a pressure in the evaporation system being introduced thereto;

a third valve provided in said introduction side of the reference pressure;

control means for setting the first, second, and third valve in a closed state at a beginning of the leakage diagnosis, and for reading a changing amount of difference pressure of said relative pressure sensor during a predetermined first period, and a changing amount of the difference pressure of said relative pressure sensor during a predetermined third period, under a condition of setting said second valve in an open state during a predetermined second period and then in the closed state during said predetermined third period; and determination means for determining presence of leakage in the evaporation system based on said changing amount of difference pressure during said predetermined first period and said changing amount of the difference pressure during said predetermined third period.

* * * * *